(12) United States Patent
Kim et al.

(10) Patent No.: US 8,289,380 B2
(45) Date of Patent: Oct. 16, 2012

(54) POLARIZED STEREOSCOPIC DISPLAY DEVICE AND METHOD

(75) Inventors: Eun-Soo Kim, Seoul (KR); Seung-Cheol Kim, Seoul (KR)

(73) Assignee: Kwangwoon University Research Institute for Industry Cooperation, Seoul (KR)

( * ) Notice: Subject to any disclaimer, the term of this patent is extended or adjusted under 35 U.S.C. 154(b) by 1544 days.

(21) Appl. No.: 11/514,617

(22) Filed: Aug. 31, 2006

(65) Prior Publication Data
US 2007/0002132 A1    Jan. 4, 2007

Related U.S. Application Data

(63) Continuation of application No. PCT/KR2004/001542, filed on Jun. 25, 2004.

(30) Foreign Application Priority Data

Jun. 12, 2004   (KR) .................. 10-2004-0043310

(51) Int. Cl.
*H04N 13/00* (2006.01)
*H04N 13/04* (2006.01)

(52) U.S. Cl. ............. 348/58; 348/42; 348/51; 348/60
(58) Field of Classification Search ............ 348/36–60
See application file for complete search history.

(56) References Cited

U.S. PATENT DOCUMENTS

| | | | | |
|---|---|---|---|---|
| 5,162,897 A * | 11/1992 | Jitsukata et al. | ................. | 348/58 |
| 5,172,254 A * | 12/1992 | Atarashi et al. | .................... | 349/9 |
| 5,875,006 A * | 2/1999 | Nagae et al. | .................. | 348/751 |
| 5,964,696 A * | 10/1999 | Mihalca et al. | ................ | 600/166 |
| 6,359,664 B1 * | 3/2002 | Faris | ................................. | 349/15 |
| 6,449,090 B1 * | 9/2002 | Omar et al. | .................... | 359/465 |
| 6,522,310 B1 * | 2/2003 | Kim | .................................. | 345/6 |
| 6,603,876 B1 * | 8/2003 | Matsuo et al. | ................ | 382/154 |

(Continued)

FOREIGN PATENT DOCUMENTS
KR    1999-0048752    7/1999
(Continued)

OTHER PUBLICATIONS

Korea Intellectual Property Office Preliminary Rejection Letter dated Mar. 10, 2006.

(Continued)

*Primary Examiner* — Joseph Ustaris
*Assistant Examiner* — Hang Gao
(74) *Attorney, Agent, or Firm* — Knobbe, Martens, Olson & Bear LLP

(57) ABSTRACT

The present invention relates to a polarized stereoscopic display method and a device thereof. In one embodiment, the device comprises a first signal processing part for signal processing the first image and producing a first input image that is input to a first projector so that a first output beam output from the first projector corresponding to the first image is output from the first projector with a 90 degree phase difference with respect to a second output beam outputted from the second projector corresponding to the second image. The first signal processing part may comprise an image rotating part for rotating an inputted image by 90 degree, a resizing part combined with an output terminal of the image rotating part for resizing the image rotated by 90 degree corresponding to a screen and output it to the first projector.

15 Claims, 20 Drawing Sheets

U.S. PATENT DOCUMENTS

| | | | |
|---|---|---|---|
| 6,765,545 B2 * | 7/2004 | Son et al. | 345/7 |
| 7,187,420 B2 * | 3/2007 | Yamazaki et al. | 348/752 |
| 7,190,518 B1 * | 3/2007 | Kleinberger et al. | 359/465 |
| 7,479,933 B2 * | 1/2009 | Weissman | 345/9 |
| 2001/0028416 A1 * | 10/2001 | Divelbiss et al. | 349/43 |
| 2002/0009299 A1 * | 1/2002 | Lipton | 396/324 |
| 2002/0113868 A1 * | 8/2002 | Park | 348/51 |

FOREIGN PATENT DOCUMENTS

| | | |
|---|---|---|
| KR | 20-0164081 | 2/2000 |

OTHER PUBLICATIONS

International Search Report for PCT/KR2004/001542, date of mailing of the ISR, Feb. 1, 2005.

* cited by examiner

POLARIZED STEREOSCOPIC DISPLAY DEVICE AND METHOD

RELATED APPLICATIONS

This application is a continuation application, and claims the benefit under 35 U.S.C. §§120 and 365 of PCT Application No. PCT/KR2004/001542, filed on Jun. 25, 2004, which is hereby incorporated by reference.

BACKGROUND OF THE INVENTION

1. Field of the Invention

The present invention relates to a polarized stereoscopic display method and a device thereof, and more particularly, to a polarized stereoscopic display method and a device thereof having a high brightness, by effectively eliminating a polarization filter.

2. Description of the Related Technology

A three-dimensional (3D) display generally refers to technology which adds visual depth information to a two-dimensional image by the use of stereoscopic technology, thereby allowing a viewer to perceive a sense of three dimensions. Over the past 50 years, many 3D display methods have been introduced, and most of them display a stereoscopic image by employing binocular disparity. That is, when right and left images, which are photographed by two cameras, are projected simultaneously, most of the conventional 3D display methods separate the right image from the left image and provide the right and left images to a viewer's right and left eyes, respectively.

The conventional methods for separating a right image from a left image are classified into glasses method (using glasses) and non-glasses method (without using special glasses). The glasses method comprises an anaglyph method, a polarized glass method, and a liquid crystal shutter method. The non-glasses method comprises a lenticular sheet method, a parallax barrier method and an optical plate method. The hologram and the volumetric 3D display methods as dimensional methods are studied. Among the conventional methods, a double polarized glasses method is widely used for stereoscopic movies, stereoscopic monitors, and etc., because it is recognized as the most reliable 3D display method. Lately a large size polarized stereoscopic projection display system, employing two LCD projectors, has been developed.

Conventionally, the polarized stereoscopic projection display system requires linear or circular polarization filters mounted on right and left projectors, so that output beams from the right and left projectors become polarized with being perpendicular each other. However, this lowers the amount of the output beams more than 50%.

Below a configuration of a conventional polarized stereoscopic projection display system will be described by referring to FIG. 1. An object (111) is photographed separately with the same distance apart as that of human eyes using a stereo camera (112). Then two image signals of the stereo camera (112) drive each stereoscopic projector (113), and produce right and right eye image signals and are projected into the projector screen (115) through a polarization filter (114). A viewer sees the image of the projector screen (115) with his right and left eyes separately through polarizing glasses (116) of which right polarization lens is different from left polarization lens, thereby a stereoscopic image is viewed.

The conventional stereoscopic projector (113) produces the right and left images by driving the right and left images inputted from the stereo camera (112) by respective stereoscopic projector systems. The right and left images, which have a perpendicular phase difference through the polarization filter (114) having a perpendicular polarization, are projected to the projector screen (115). That is, the conventional stereoscopic projector 113 is consisted of pairs, such as two lenses, two LCDs driven by image signals and showing the images, thereby embodying respective right and left images and having them perpendicularly polarized through the right and left eye polarization filters (114) and then projecting them on the screen.

FIG. 2 shows the linear polarization filter (114) used in the above conventional projector. The large size stereoscopic projection system using a polarization effect has the linear polarization filters (114), which are oriented at +/−45°, or clockwise and counter-clockwise circular polarization filters placed in front of the right and left projectors respectively. A viewer can sense a three-dimensional effect by wearing polarizing glasses, which allow the viewer to see the right and left eye images separately.

As described above, the conventional polarized stereoscopic projection display system requires the linear or circular polarization filter placed in front of the projector, so that the output beams of the right and left projectors become perpendicularly polarized with each other. This lowers the intensity of the output beam more than 50%.

SUMMARY OF CERTAIN INVENTIVE ASPECTS

One aspect of the present invention provides a polarized stereoscopic display method and a device thereof having a high brightness with no output light loss, by eliminating effectively a polarization filter with employing the polarization properties of a LCD projector and a color signal process method. One embodiment of the present invention may provide a stereoscopic image without a polarization filter with employing the characteristic output beam properties of the LCD display device.

Another aspect of the present invention provides a method of solving the problem of light loss with employing the polarized stereoscopic projection display system with no output light loss by eliminating the polarization filter which is the cause of the light loss from the prior projection display system by the effective process of the characteristic polarization properties of the LCD projector and the color video signal.

Another aspect of the present invention provides a substantial possibility of commercialization by designing a prototype of 100″ 2D/3D projection TV and verifying the performance and effect through an optical experiment.

Another aspect of the present invention provides a polarized stereoscopic display device for displaying stereoscopically a first image and a second image of a predetermined object photographed independently from a different angle, the device comprising a first signal processing part for signal processing the first image, producing a first input image, and inputting it to a first projector so that a first output beam outputted from the first projector corresponding to said first image has a 90 degree phase difference from a second output beam outputted from the second projector corresponding to said second image, wherein the first signal processing part comprising an image rotating part for rotating an inputted image by 90 degree and a resizing part combined with an output terminal of the image rotating part for resizing the image rotated by 90 degree corresponding to a screen and outputting it to the first projector.

In one embodiment, said first signal processing part further comprises a first signal synthesizing part for synthesizing a R (RED) signal and a B (blue) signal of the first image and a G (Green) signal of the second image and inputting it the image rotating part.

In one embodiment, the polarized stereoscopic display device further comprises a second signal processing part for signal processing the second image, producing a second input image, and inputting it to a second projector so that the second output beam is outputted from the second projector with a 90 degree phase difference with respect to the first output beam.

The second signal processing part may further comprise a second signal synthesizing part for synthesizing a R (RED) signal and a B (blue) signal of the second image and a G (Green) signal of the first image.

The first projector may be combined with the output terminal of the first signal processing part and installed with a 90 degree rotation from the second projector so that the first output beam has a 90 degree phase difference from the second output beam.

The first projector may further comprise a first polarization part combined with the output terminal of the first signal processing part and installed with a 90 degree rotation from a second polarization part included in the second projector so that the first output beam has 90 degree phase difference from the second output beam.

The polarized stereoscopic display device may further comprise a display part for reflecting the output beam outputted from the first projector and the second projector with employing at least one reflecting mirror and sending it to the screen.

Still another aspect of the present invention provides a polarized stereoscopic display method of displaying stereoscopically a first image and a second image of predetermined object photographed independently from a different angle, the method comprising: (a) signal processing the first image and producing a first input image so that a first output beam corresponding to said first image is outputted from a first projector with a 90 degree phase difference from a second output beam corresponding to said second image and (b) inputting the first input image to the first projector and outputting a second input image corresponding to the second image to a second projector.

(a) may further comprise rotating a phase of the first image by 90 degree and resizing the first image rotated by 90 degree corresponding to a screen.

(b) may further comprise producing the second input image by synthesizing a R (RED) signal and a B (blue) signal of the second image and a G (Green) signal of the first image.

The polarized stereoscopic display method may further comprise outputting the first output beam by said first projector installed with a 90 degree rotation from the second projector so that the first output beam has a 90 degree phase difference from the second output beam.

The polarized stereoscopic display method may further comprise outputting the first output beam by said first projector including a first polarization part installed with a 90 degree rotation from a second polarization part included in the second projector so that the first output beam has a 90 degree phase difference from the second output beam.

The polarized stereoscopic display method may further comprise reflecting said first output beam and said second output beam with employing at least one reflecting mirror and sending it to the screen.

DETAILED DESCRIPTION OF CERTAIN INVENTIVE EMBODIMENTS

Figure 1:
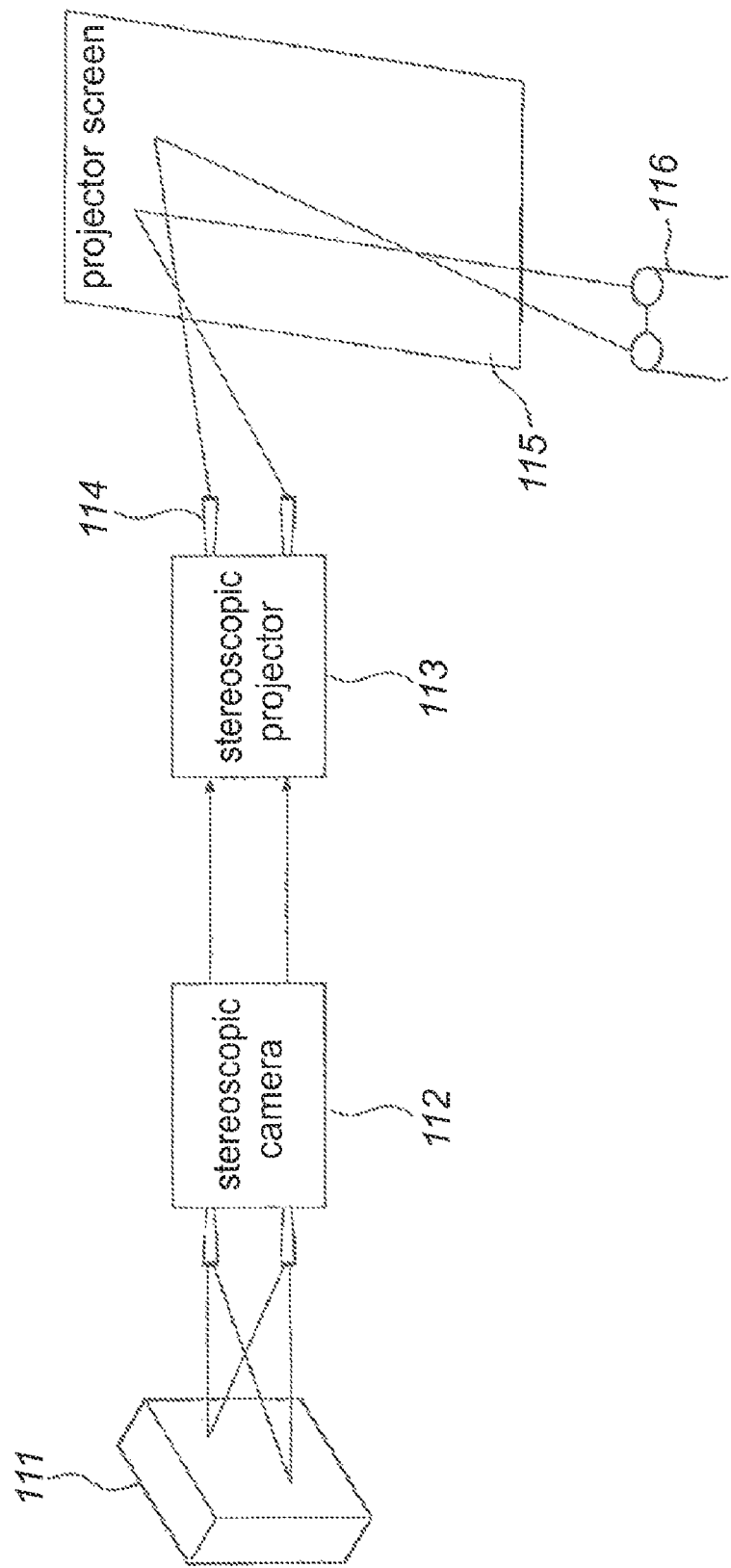
FIG. 1 illustrates an entire configuration of a stereoscopic display device according to the prior art.
Figure 2:
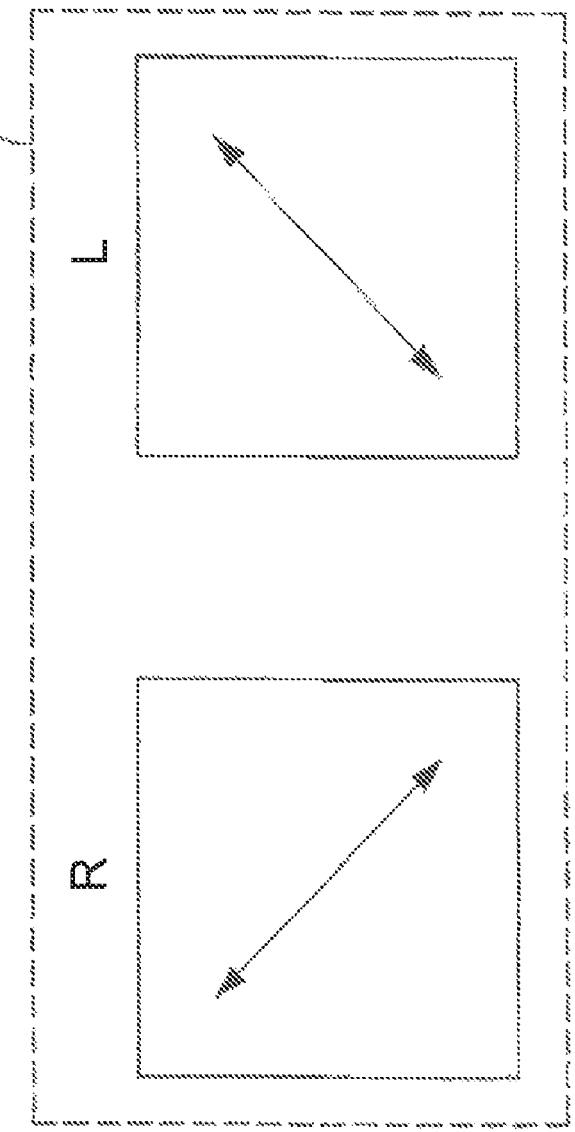
FIG. 2 illustrates a linear polarization filter according to the prior art.

Hereinafter, same reference characters designate the same or similar parts throughout the drawings and the repeated description about the same reference characters is omitted.

Polarization Properties of the LCD Projector

Figure 4:
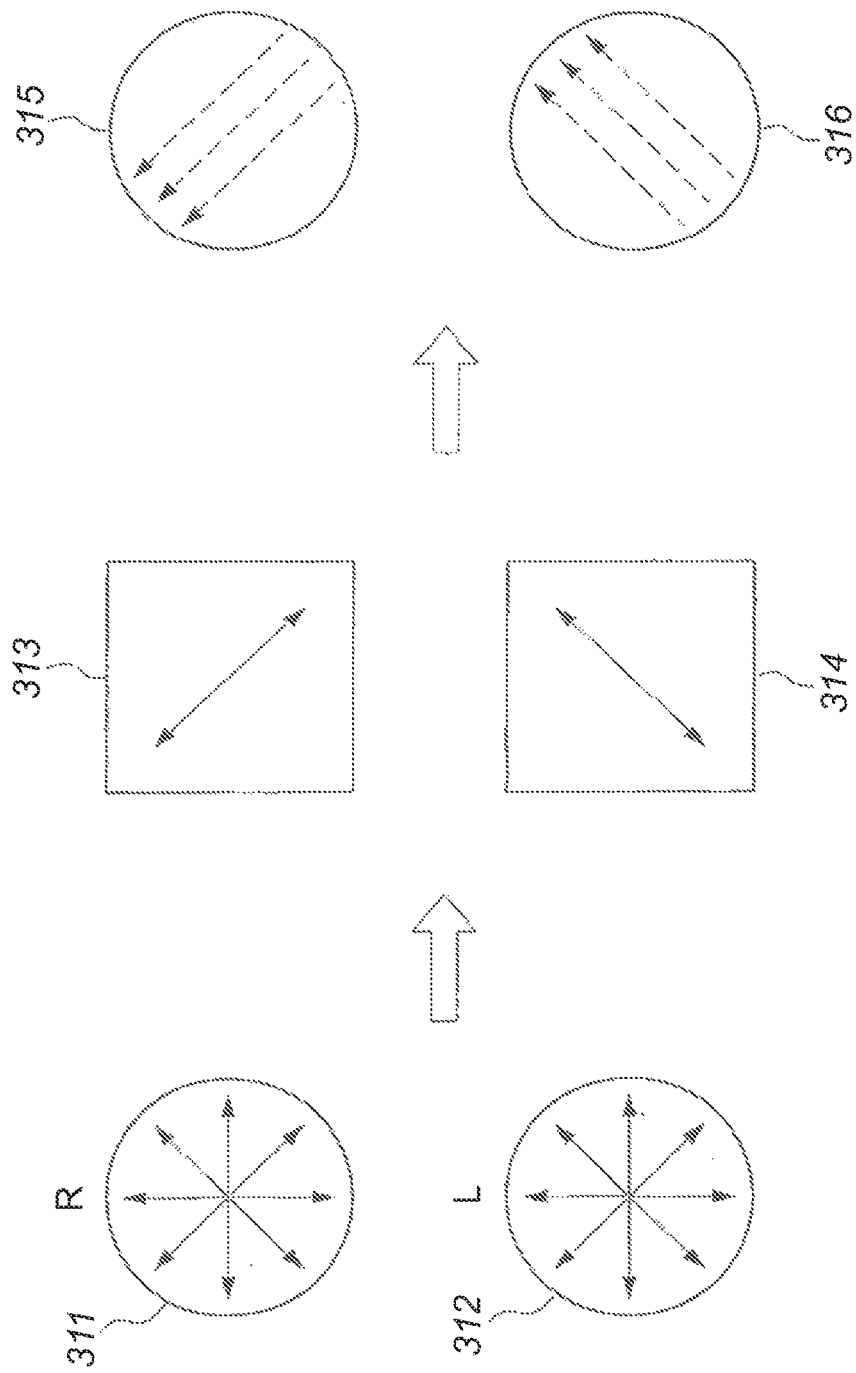
FIGS. 4 to 6 illustrate the output signal of a projector and the properties of a linear polarization filter according to the prior art.
Figure 5:
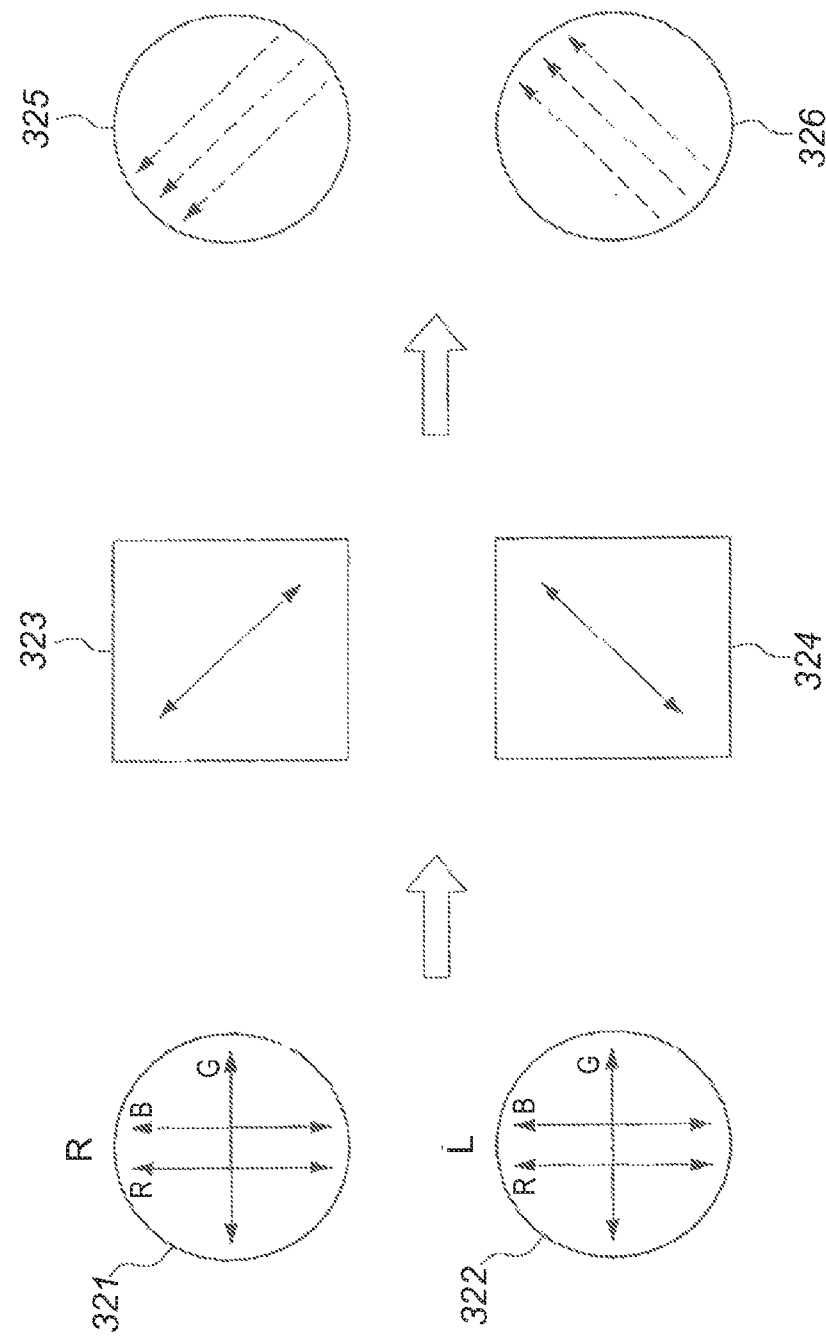
Figure 6:
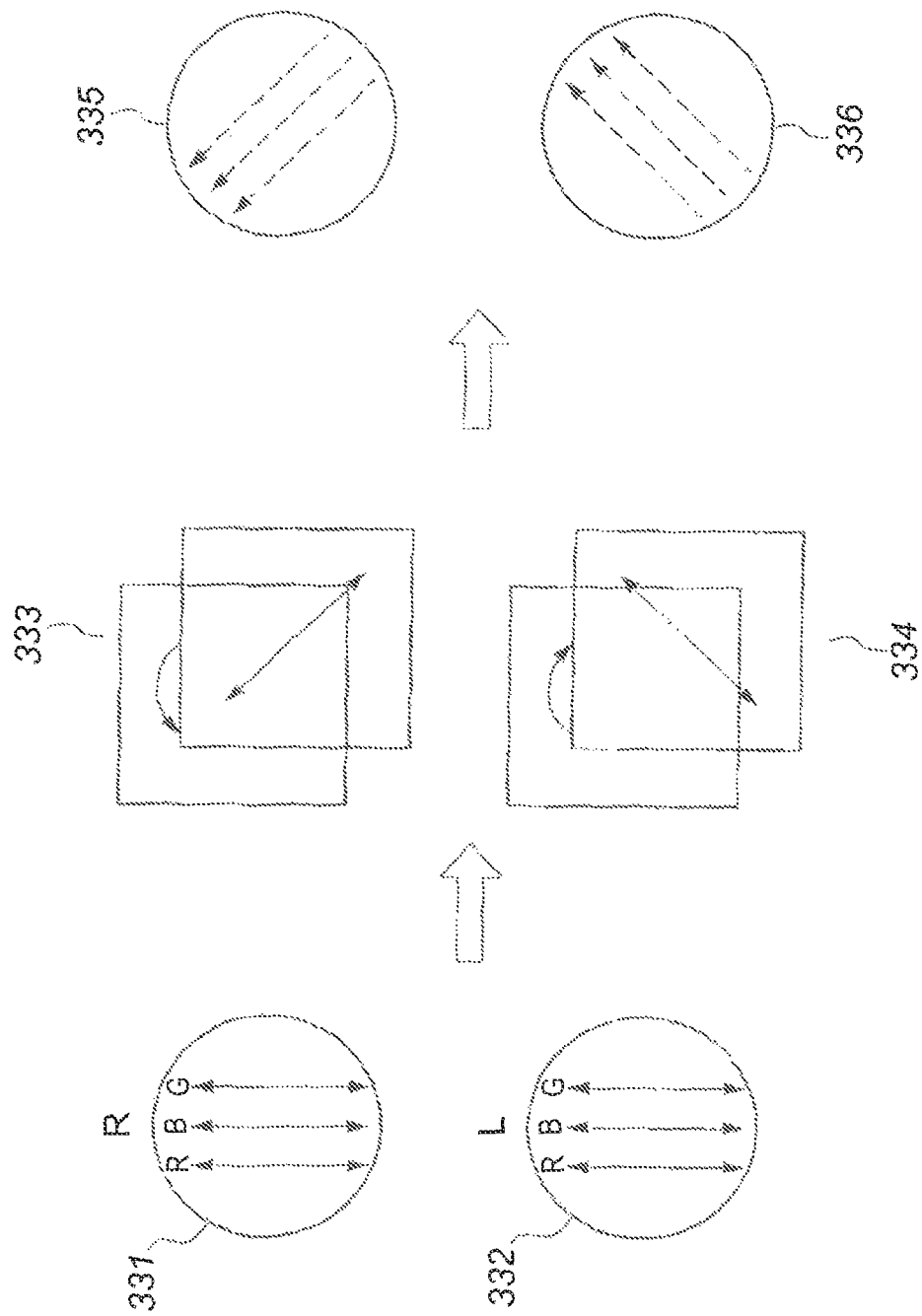
Figure 7:
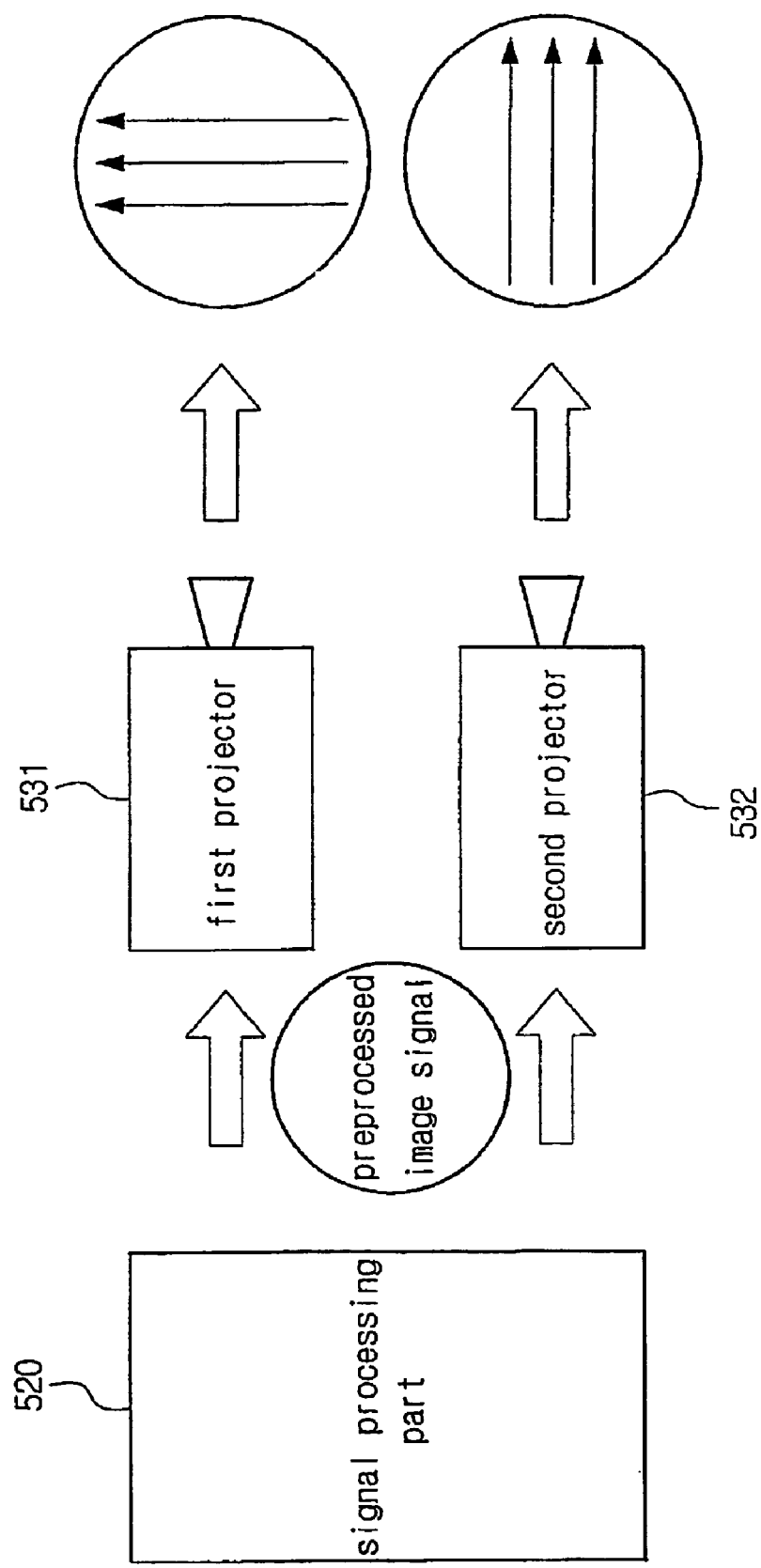
FIG. 7 illustrates polarization properties of output beam according to one embodiment of the present invention.

One embodiment of the present invention may provide a new polarized stereoscopic projection display device with no output light loss by eliminating the polarization filter which is a cause of the light loss of the prior projection display system with processing effectively the characteristic polarization properties of a LCD projector and a color video signal. Hereinafter, FIG. 3 illustrates polarization properties of the output beam of the LCD projector, FIGS. 4 to 6 illustrate the method of stereoscopic realization according to the prior art, FIG. 7 illustrates a method of stereoscopic realization according to the preferable embodiment of the present invention.

Figure 3:
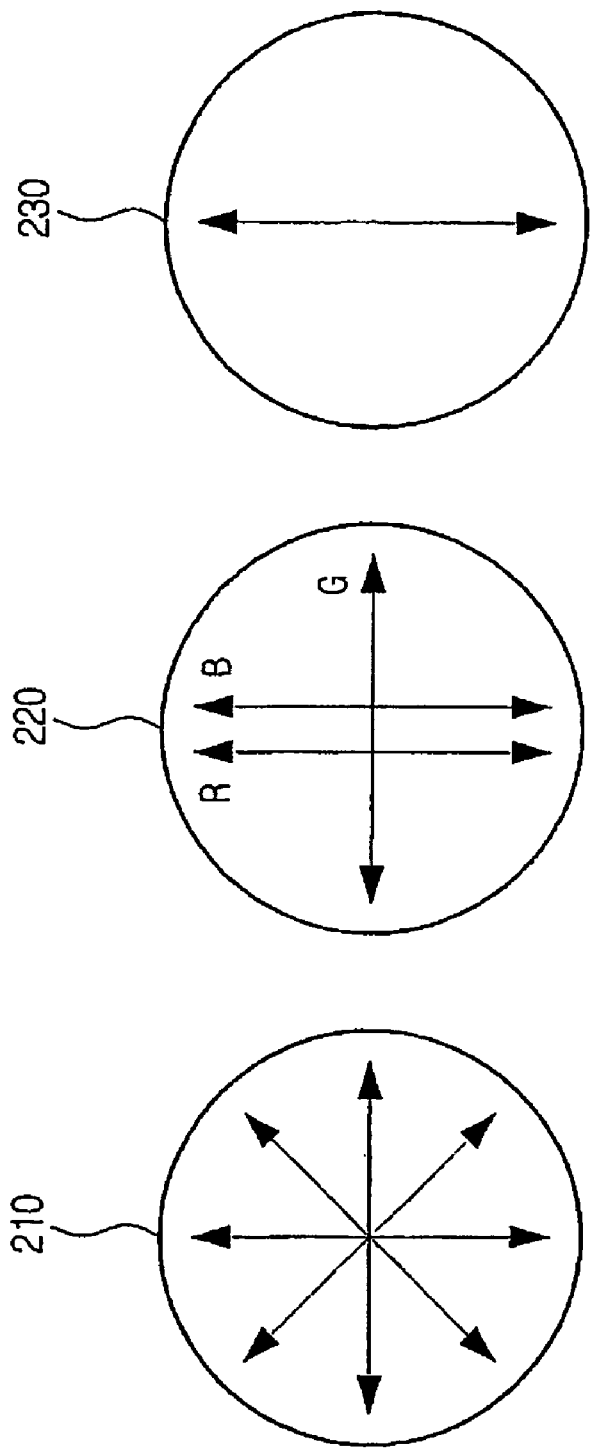
FIG. 3 illustrates polarization properties of the output beam of each projector according to one embodiment of the present invention.

FIG. 3 illustrates polarization properties of the output beam of each projector according to one embodiment of the present invention.

Generally, the commercial projectors used in the polarized stereoscopic projection display system may be classified into three types according to the polarization state of the output beam.

Hereinafter, referring to FIG. 3, the projectors having an unpolarized output beam (210) include CRT, DMD, DLP projector, and the like. And in the output beam (220) of most commercial 3 panel LCD projectors, a red and a blue have the perpendicular polarization and a green has the horizontal polarization. Some other commercial 1 panel or 3 panel LCD projectors have the linear polarized output beam (230) with red, blue and green in the same directions. Hereinafter, the output beam with colors polarized in the different direction as the red and the blue have the perpendicular polarization and the green has the horizontal polarization is referred to as 'rectangular polarization output beam', and the linear polarized output beam with all colors in the same direction is referred to as 'the same polarization output beam'.

Generally, in polarized stereoscopic projection display system, since the polarization process is essential for making the right and the left projector output beam polarized in orthogonal directions, there is a problem that about 50% of light energy might be lost in the process of polarizing. So, the polarization state of the beam outputted from projector and the direction of the polarization filter must be considered to obtain an optimal polarized projection display system. While the direction of the polarization filter is not so important because the output beam (210) of CRT or DMD projector is unpolarized, the polarized output beam and the direction of the polarizer must be considered with care for an effective stereoscopic projection system because the rectangular polarization output beam (220) and the same polarization output beam (230) are already polarized.

Referring to the following table 1, the rectangular polarization output beam (220) and the same polarization output beam (230) are classified respectively as first type and second type.

TABLE 1

| Type of output beam | Contents |
|---|---|
| first type | The rectangular polarization output beam—the polarization directions of the output beam are orthogonal to each other |
| second type | The same polarization output beam—the polarization directions of the output beam are the same to each other |

FIGS. 4 to 6 illustrate the difference of the polarization method according to the prior art and one embodiment of the present invention. And FIG. 7 illustrates a lossless polarized stereoscopic display method according to one embodiment of the present invention. Hereinafter, the configuration of the output beam according to one embodiment of the present invention is described and compared with that of the output beam according to the prior art.

Firstly, referring to FIGS. 4 to 6, the polarization method according to the prior art is described. In case of the projector which has unpolarized output beams (311, 312) corresponding to the right and left eye, as shown in FIG. 4, in the front of the projector, linear polarization filters (313, 314) corresponding to the right and left eye are oriented at +/−45° from the vertical axis and inserted into the stereoscopic projection display system. The unpolarized output beam (311, 312) passes the polarization filter (313, 314) and there is a problem that the intensity of the output beam (315, 316) corresponding to the right and left eye decreases (shown by dotted line).

In the rectangular polarization output beam of the first type, the output beam (321, 322) corresponding to the right and left eye, as shown in FIG. 5, two color components (Red, Blue) in the output beam are linear polarized vertically and the other color component (Green) is linear polarized horizontally therefrom. In this case, linear polarization filters (323, 324) corresponding to the right and left eye are oriented at +/−45° from the vertical axis and inserted into the polarized stereoscopic projection display system. The rectangular polarization output beam (321, 322) passes also the polarization filter (323, 324) and there is the problem that the intensity of the output beam (325, 326) corresponding to the right and left eye decreases (shown by dotted line).

In the same polarization output beam of the second type, the output beam (331, 332) corresponding to the right and left eye, as shown in FIG. 6, with employing a polarization rotator, is rotated by +/−45° in polarization direction corresponding to the right and left eye and linear polarization filters (333, 334) are oriented at that direction and inserted into the polarized stereoscopic projection display system.

The same polarization output beam (331, 332) passes also the polarization filter (333, 334) and there is the problem that the intensity of the output beam (335, 336) corresponding to the right and left eye decreases (shown by dotted line). Like this, the prior polarization method has the problem that the intensity of the output beam decreases because of the polarization filter. But, one embodiment of the present invention eliminates the polarization filter and makes output beams orthogonal to each other with employing polarization properties of LCD in projector.

Referring to FIG. 7, the lossless polarized stereoscopic display method according to one embodiment of the present invention is described. Referring to polarization properties of output beam according to the prior projector, there is a problem that the output beam outputted from the projector passes the polarization filter which causes the reduced polarization properties and the light intensity. But, one embodiment of the present invention may make orthogonal output beams be outputted from a first projector (531) and a second projector (532) without the polarization filter by signal preprocessing an image signal inputted from a camera part in a signal processing part (520) and inputting the signal processed left eye image and right eye image into the projector. That is, one embodiment of the present invention does not produce orthogonal signals by signal processing the beam outputted from the projector as the prior art but preprocesses the signal corresponding to the projector and inputs it into the projector so that the undecreased orthogonal signals (shown by solid line) (541, 542) are outputted.

Entire Configuration and Function Process

Figure 8:
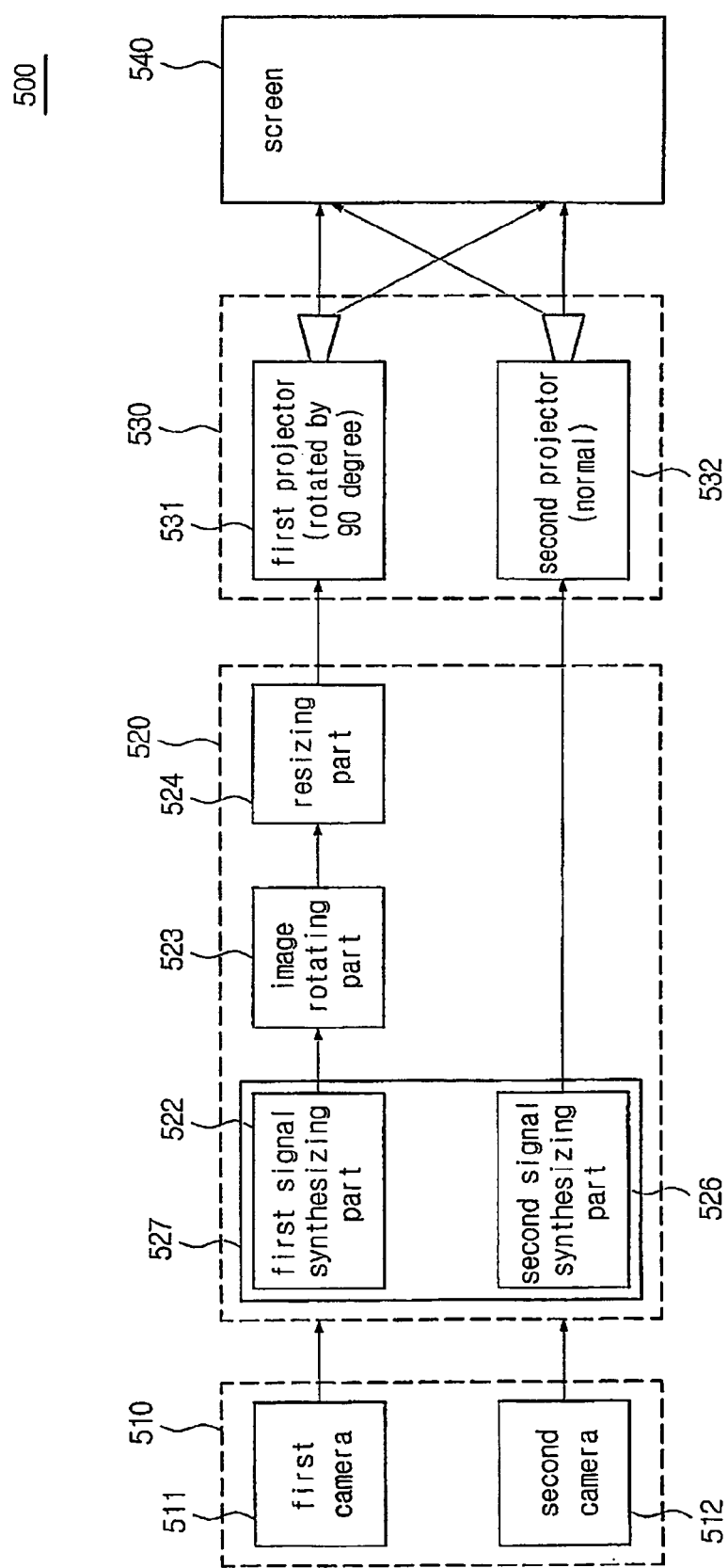
FIG. 8 illustrates a configuration of the stereoscopic display device according to one embodiment of the present invention.
Figure 9:
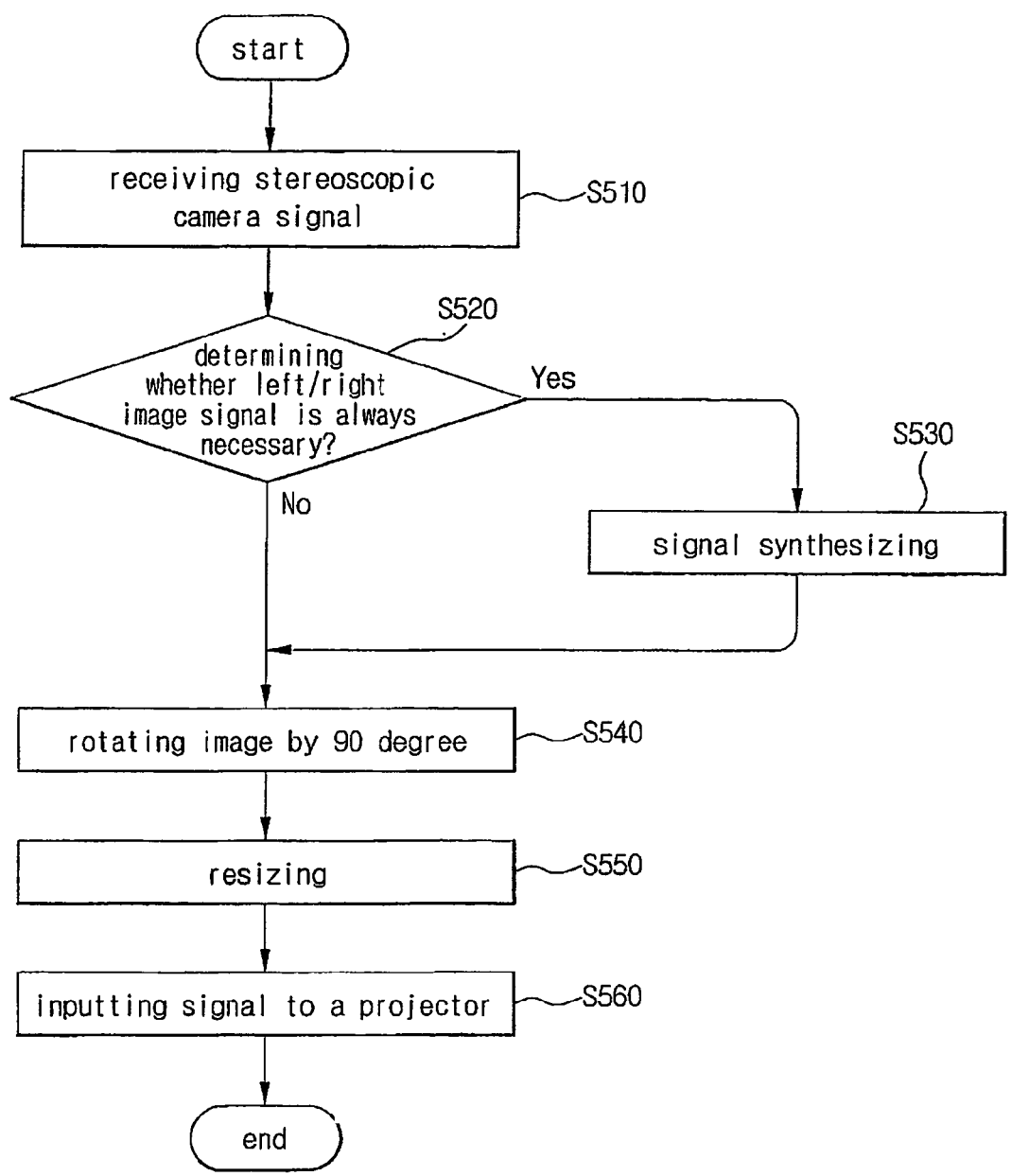
FIG. 9 is a flow chart for describing a function of the stereoscopic display device according to one embodiment of the present invention.

Here, a configuration and a function principle of the lossless polarized stereoscopic display device according to one embodiment of the present invention are described in detail referring to the appended Figs. Hereinafter, FIG. 8 illustrates a configuration of the lossless polarized stereoscopic display device according to one embodiment of the present invention, and FIG. 9 illustrates a function principle of the device shown in FIG. 8.

FIG. 8 illustrates a configuration of the lossless polarized stereoscopic display device according to one embodiment of the present invention. One embodiment of the present invention may provide a polarized stereoscopic projection display device with no output light loss, by eliminating effectively a polarization filter which is a cause of light loss from the prior projection display system with employing the polarization properties of a LCD projector and a color signal.

Referring to FIG. 8, a lossless polarized stereoscopic display device (500) according to one embodiment of the present invention may comprise a camera part (510), a signal processing part (520), a projector part (530) and a screen part (540).

The camera part (510) may photograph an object (not shown) at an angle of each eye (right and left eye) with a slightly different view of a scene and provide two photographed image signals to the signal processing part (520). Here, the camera part (510) may comprise two stereo cameras (511, 512) corresponding to the right eye and the left eye.

The signal processing part (520) produces an input image signal for preprocessing the image signal outputted from the camera part and inputting it into the projector part so that output beams of the projector part have orthogonal phase difference to each other without the polarization filter. The input image signal outputted from the signal processing part (520) passes each projector (531, 532) and may generate orthogonal right and left output beam. A viewer may see a stereoscopic image from the image of a projector screen (540) by watching two separate images of right and left with wearing polarizing glasses having a polarization lens where the right lens and the left lens have different polarization from each other.

The projector part (530) is a device, which enlarges the image and projects it on the large-sized screen, and is used widely because it uses the large-sized screen as a monitor. The conventional projectors corresponding to the right eye and the left eye are the same to each other in the configuration and the function, but the one projector (531) according to one embodiment of the present invention outputs the output beam rotated by 90 degree from that of the other projector and the signal processing part (520) rotates the output beam by 90 degree beforehand in the opposite direction so that the projector (531) may output the output beam returned to the normal angle.

The signal processing part (520) may comprise an image rotating part (523) and a resizing part (524) and may further comprise a signal synthesizing part (527). The image rotating part (523) rotates the phase of the image signal by 90 degree and the resizing part (524) resizes the image rotated by 90 degree corresponding to a screen. And generally, in the method for realizing the stereoscopic image, two cameras photograph an object and the two images are projected superimposed onto the same screen through orthogonal polarizing means, and with wearing polarizing glasses having orthogonal polarizing lens, the viewer may look at the images taken from the two cameras in each eye and the stereoscopic image may be achieved. This method for realizing the stereoscopic image is used in a three-dimensional film, a stereoscopic image projector and so on. In one embodiment, although not shown in drawings, the projector (530) may include at least one of the image rotating part (523) and the resizing part (524). FIG. 9 is a flow chart for describing a function of the lossless polarized stereoscopic display device according to one embodiment of the present invention. Referring to FIG. 9, the process according to one embodiment of the present invention is as follows.

In step S510, the polarized stereoscopic display device receives the image signal corresponding to the first image and the second image of an object photographed from different angles from a stereo camera. In step S520, it determines whether a synthesizing process of a left eye image and a right eye image is necessary according to the kinds of the projector. By the preferable embodiment, the first type needs the synthesizing process, but the second type doesn't need the synthesizing process.

If the synthesizing process is necessary, in step S530, at least one signal of RGB image included in right eye signal and at least one signal of RGB image included in left eye image are synthesized and a RGB signal inputted into the projector is produced. In step S540, the left eye image or the right eye image is rotated by 90 degree, in step S550, the rotated image is resized corresponding to the screen and an input image signal is produced. In step S560, the processed left eye image and the input image signal corresponding to the right eye are inputted into the projector.

Here, the projector corresponding to the image rotated by 90 degree may be disposed rotated by 90 degree from the other projector or comprise the polarization part disposed rotated by 90 degree from the polarization part included in the other projector. So, the output beam with a normal phase angle may be outputted. The output beam outputted into the projector is reflected with employing at least one reflecting mirror and projected onto the screen. Hereinafter, the rectangular polarization output beam (220) and the same polarization output beam (230) are respectively classified as the first type and the second type and the further detailed configuration is described.

First Type-Rectangular Polarization Output Beam

Figure 10:
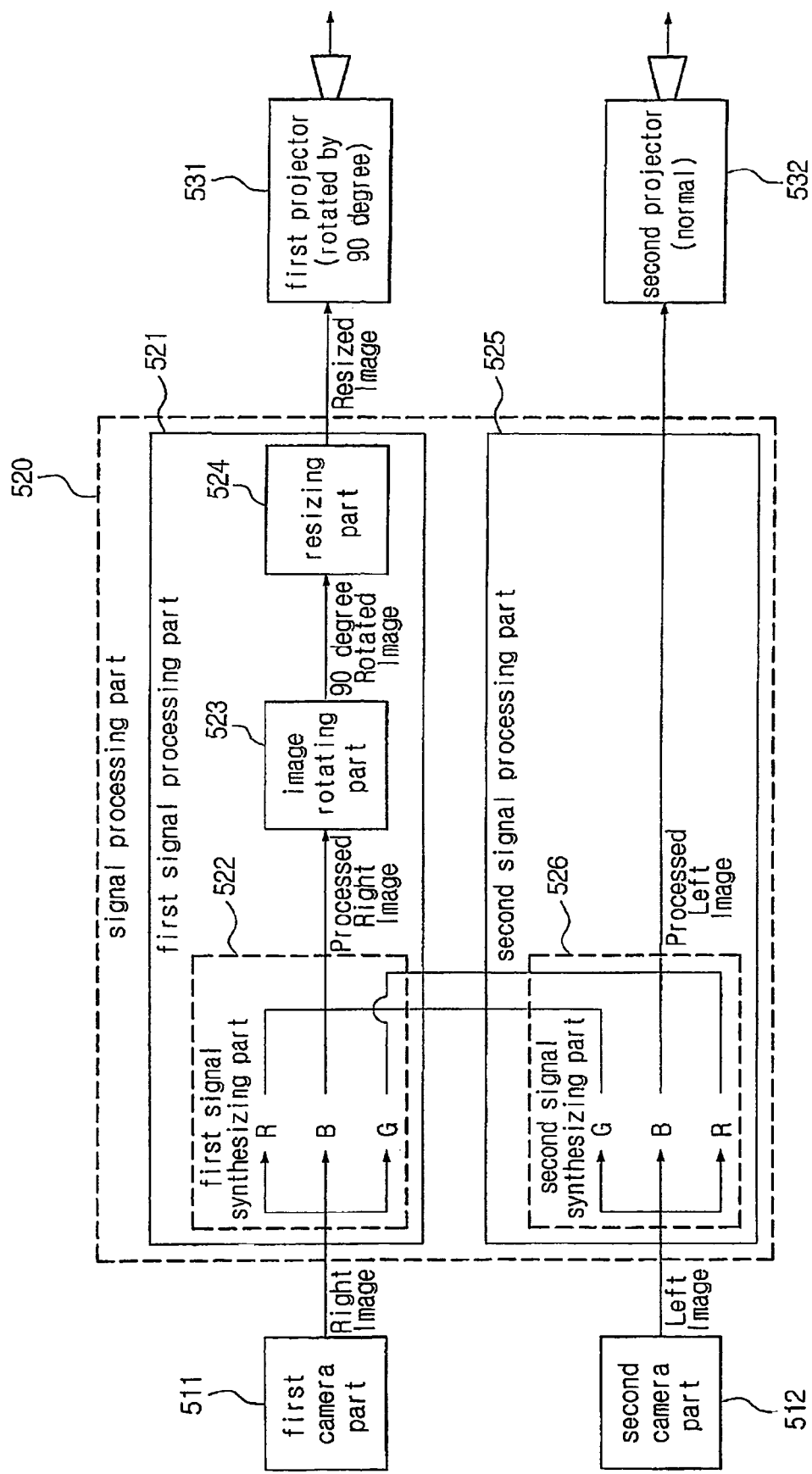
FIG. 10 and FIG. 11 illustrate a first type stereoscopic display device according to one embodiment of the present invention.
Figure 11:
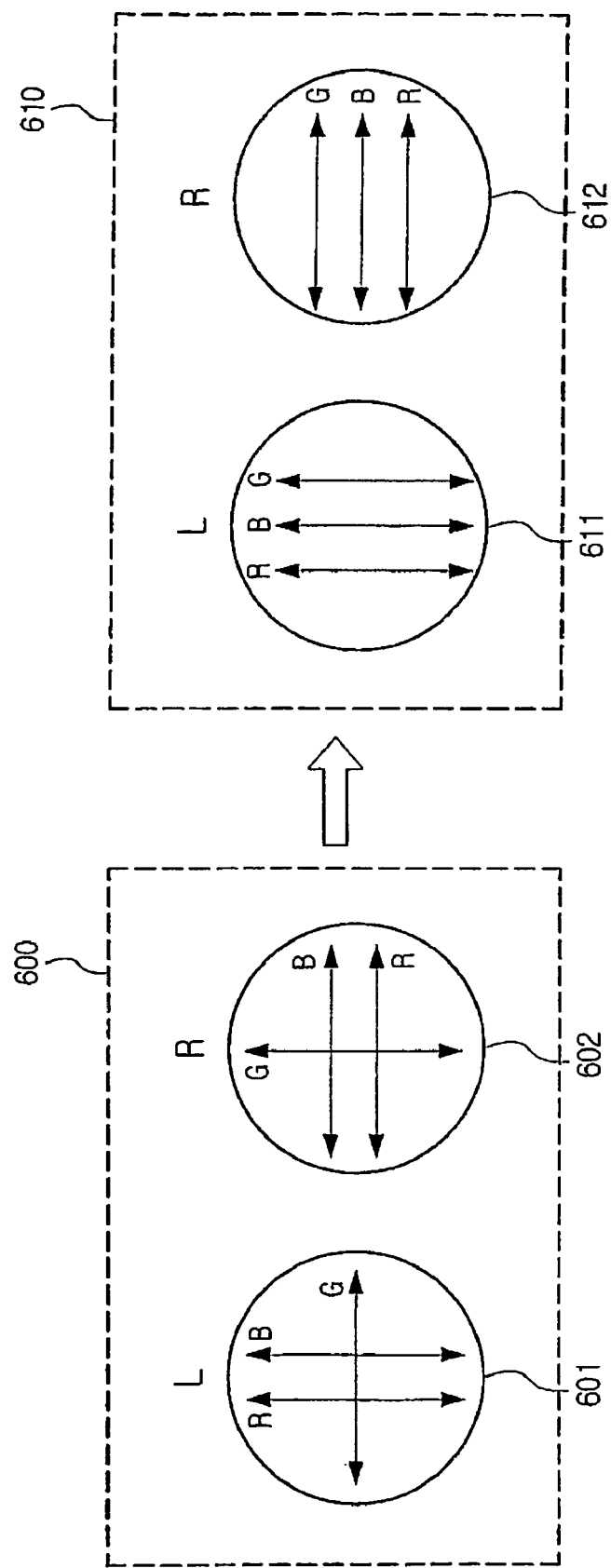

FIG. 10 and FIG. 11 illustrate a first type stereoscopic display device according to one embodiment of the present invention. Hereinafter, it is described about the case that the first image may be the right eye image and the second image may be the left eye image, but the present invention is not limited to that.

Referring to FIG. 10, the signal processing part (520) may comprise a first signal processing part (521) and a second signal processing part (525). The first signal processing part (521) may produce the first input image signal for signal processing the first image and outputting it to the first projector so that the first output beam is outputted from the first projector with a 90 degree phase difference from the second output beam. And the second signal processing part (525) may produce the second input image signal for signal processing the second image and outputting it to the second projector so that the second output beam is outputted from the second projector with a 90 degree phase difference from the first output beam.

Here, the first signal processing part is combined with an image rotating part for rotating the first image by 90 degree and an output terminal of the image rotating part, and may comprise the resizing part for resizing the first image rotated by 90 degree corresponding to the screen and outputting it into the first projector. And, the first signal processing part comprise a first signal synthesizing part (522) for synthesizing the R (RED) signal and B (blue) signal of the first image and the G (Green) signal of the second image, and may further comprise a second signal synthesizing part (526) for synthesizing the R (RED) signal and B (blue) signal of the second image and the G (Green) signal of the first image.

Referring to FIG. 11, the output polarization properties of the stereo LCD projector according to the first type is described. The left (600) of FIG. 11 illustrates the output polarization state of the projector about the left eye image (normal state) (601), the right eye image (rotated by 90 degree) (602) before synthesizing process. And the right (610) of FIG. 11 illustrates the output polarization state of the projector about the left eye image (perpendicular state) (611), the right eye image (horizontal state) (612) reorganized after the synthesizing process of color components.

In the left (600) of FIG. 11, the projector (L) is in a normal state, the Red and Blue component is polarized perpendicularly and the Green component is polarized horizontally. However, the right projector (R) corresponding to the right eye image is rotated by 90 degree from the left projector and as a result, the Red and Blue component is polarized horizontally and the Green component is polarized perpendicularly. Here, in case that the image signal is inputted, the Red, Blue component of the projector in a normal state and the Green component of the projector rotated by 90 degree are polarized perpendicularly, on the contrary, the Green component of the projector in a normal state and the Red, Blue component of the projector rotated by 90 degree are polarized horizontally. So, the color components of the right and the left projector are synthesized (reorganized) into the new perpendicular and horizontal component through signal processing and the input image signal according to one embodiment of the present invention is produced. After this, if the input image signal is inputted into the right and the left projector, then the viewer may look at the stereoscopic image with a 0 and 90 degree linear polarized glasses from the right and left eye image projected onto the screen.

According to one embodiment of the present invention, the right projector may be rotated by 90 degree from the left projector and reorganized right and left input image signals may be produced by reorganizing the right image and the left image signal into color components polarized perpendicularly and horizontally through signal processing. So, the signal processed input image signal is inputted into the right and the left projectors and projected onto the screen and the viewer may look at the stereoscopic image with a 0 and 90 degree linear polarized glasses. So the stereoscopic projection system provided newly does not need the polarization filter for making the output beams of the right and the left projectors polarized orthogonal to each other according to the prior art, so there is no light loss.

Hereinafter, the process according to the first type is as follows. Firstly, the right image and the left image inputted from two cameras are divided respectively into the Red, Blue, Green component and the Red, Blue component of the left eye image and the Green component of the right eye image are synthesized and a new left input image of which all color components is polarized perpendicularly is produced. After this, the input image is projected onto the screen with employing the left projector in a normal state. Likewise, the Red, Blue component of the right eye image and the Green component of the left eye image are synthesized and a right eye image of which all color components is polarized horizontally is produced. After this, the right eye image is rotated by 90 degree and resized corresponding to the size of the screen and the right input image is produced. That is, since the image rotated by 90 degree has a aspect ratio of 3:4, it is resized into 4:3. The reorganized right eye input image is projected onto the screen through the right projector rotated by 90 degree and it is matched to the left eye input image.

Second Type—the Same Polarization Output Beam

Figure 12:
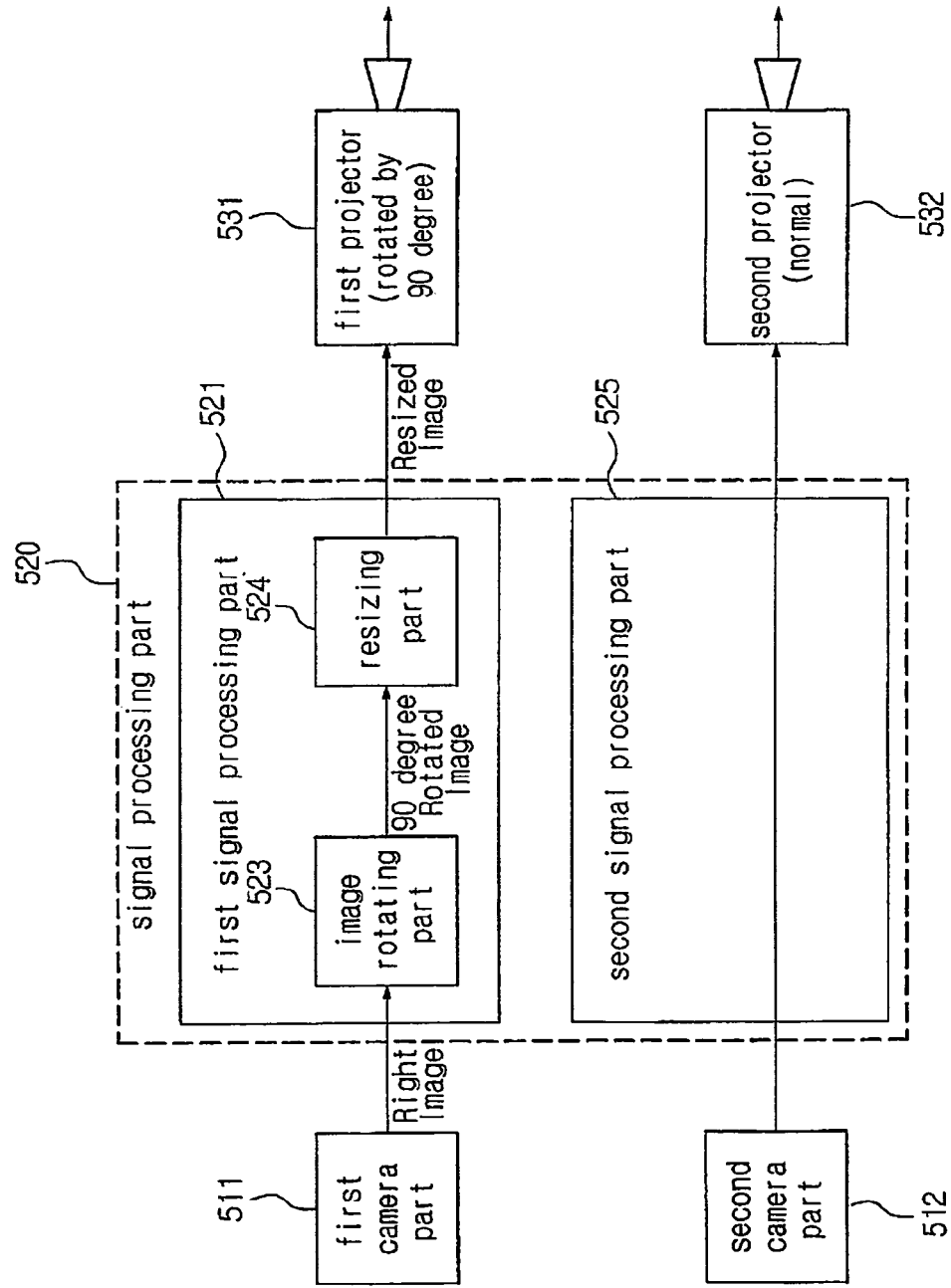
FIG. 12 and FIG. 13 illustrate a second type stereoscopic display device according to one embodiment of the present invention.
Figure 13:
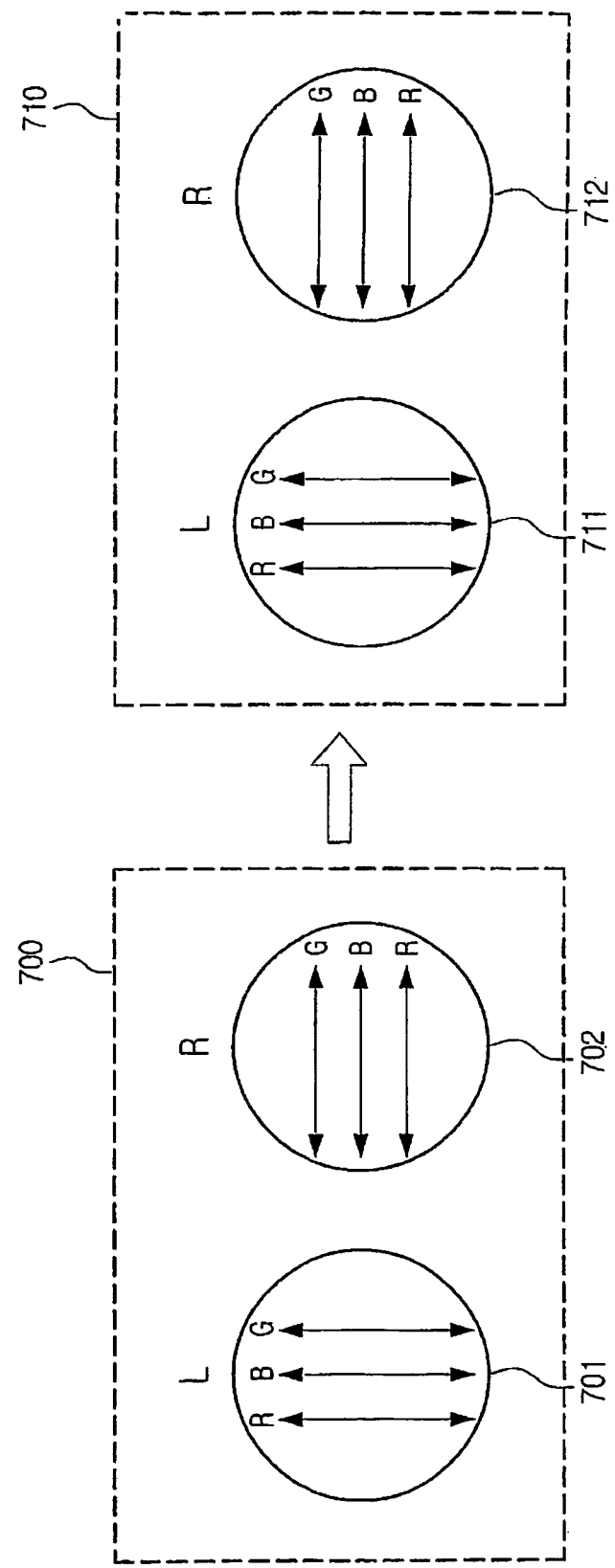

FIG. 12 and FIG. 13 illustrate a second type stereoscopic display device according to another embodiment of the present invention.

Referring to FIG. 12, the signal processing part (520) comprises the first signal processing part (521), and the second signal processing part transmits the image signal inputted from the camera part to the second projector without any extra signal processing. So, the second image may be the same to the second input image in the second signal processing part. Since the other description is the same or similar to that of FIG. 10, the detail description is omitted.

Referring to FIG. 13, the output polarization properties of the stereo LCD projector according to the second type is described.

The left (700) of FIG. 13 illustrates the output polarization state of the projector about the left eye image (normal state) (701), the right eye image (rotated by 90 degree) (702) before synthesizing process. And the right (710) of FIG. 13 illustrates the output polarization state of the projector about the left eye image (perpendicular state) (711), the right eye image (horizontal state) (712) reorganized after the synthesizing process of color components. Referring to the left (700), the left projector (L) is in a normal state and all color components are polarized perpendicularly. If the right projector (R) is rotated by 90 degree from the left projector, the polarization state of the all color components are converted from perpendicularity to horizontalness. So, the right image and the left image are projected through the projectors in the orthogonal polarization state and the viewer may see the stereoscopic image with a 0 and 90 degree linear polarized glasses.

In case of the second type, unlike the first type, all color components are in the same polarization state, so the exchange of color components between the right projector and the left projector is not necessary. So, among the left image and the right image inputted from two cameras, the left eye image is projected into the screen through the left projector in a normal state, the right eye image is rotated by 90 degree and resized to 4:3 aspect ratio. And this image is projected onto the screen through the right projector rotated by 90 degree and superimposed to the left eye image.

Experiment Results

Hereinafter, optical experiment results for analyzing the efficiency of the polarized stereoscopic projection system according to one embodiment of the present invention are described. That is, two IEEE 1394 cameras are employed for the stereo camera system. The two cameras are controlled to be on the epipolar line geometrically and the distance between the centers of two cameras is kept to be about 65 mm. The specifications of the stereo camera model (Aplux C102T) used in the experiment is as table 2.

TABLE 2

| Data format | YUV(4:1:1), YUV(4:0:0), YUV(4:4:4), RGB 24-Bit, UYVY, YUY2 |
|---|---|
| Sensor | Sony ¼ inch CCD sensor |
| Resolution | 350K pixels |
| Video mode | 640 × 480/320 × 240/160 × 120 |
| Frame rate | Still image to 30 frames per second |
| Focus distance | 2.42[mm] |
| Viewing angle | 50[degree] |

And, the right eye image and the left eye image obtained from the right camera and the left camera are reorganized by the signal processed color image converting method according to one embodiment of the present invention and are projected onto the screen through the right projector and the left projector. Here, one projector is in a normal state and the other projector is rotated by 90 degree physically. In this experiment, NEC projector (Model: MT1060) is used and the specifications of that is as table 3.

TABLE 3

| LCD panel | 1.0" Polysilicon TFT |
|---|---|
| Resolution | 1024 × 768[XGA] |
| Best Resolution | 1600 × 1200[UXGA] |
| Contrast rate | 800:1 |
| Brightness | 2600 [ANSI Lumens] |

And the 100" microgem screen is employed, which may provide a wide viewing angle of 160° on both vertical and horizontal directions and uniform stereoscopic image with high brightness. The following table 4 is the specifications of the microgem screen employed in this experiment.

TABLE 4

| screen size | 100 inches |
|---|---|
| Light effect | 80% ± 2% |
| Focus distance of the Fresnel lens | 2250 mm |
| Best gain | 3 ± 0.5 |
| perpendicular/horizontal viewing angle | 160° ± 6° |

According to the experiment results, it is noted that the right image projected onto the screen through the right projector rotated by 90 degree has a aspect ratio of 3:4, so it is resized by aspect ratio of 4:3 corresponding to the image of the left projector with employing the 3D Reform function of the projector and the right image and the left image superimposed accurately to each other are produced on the screen. The viewer may see the stereoscopic image of high brightness with a 0 and 90 degree linear polarized glasses from the right image and the left image projected onto the screen.

According to the experiment results, while about 50% of light energy might be lost in the process of polarizing with employing a linear or circular polarization filter in front of the projector in the prior method, the system according to one embodiment of the present invention eliminates the polarization filter and the stereoscopic projection system of high efficiency without output light loss is provided with employing polarization properties of LCD projector.

System Embodiment

Hereinafter, referring to FIG. 14 and FIG. 15, a stereoscopic projection system including the projector part according to one embodiment of the present invention is described. The embodiments may be classified by the number of the reflecting mirror of the projection system according to embodiments of the present invention, but it is obvious that the present invention is not limited to these embodiments described in FIG. 14 and FIG. 15.

Figure 14:
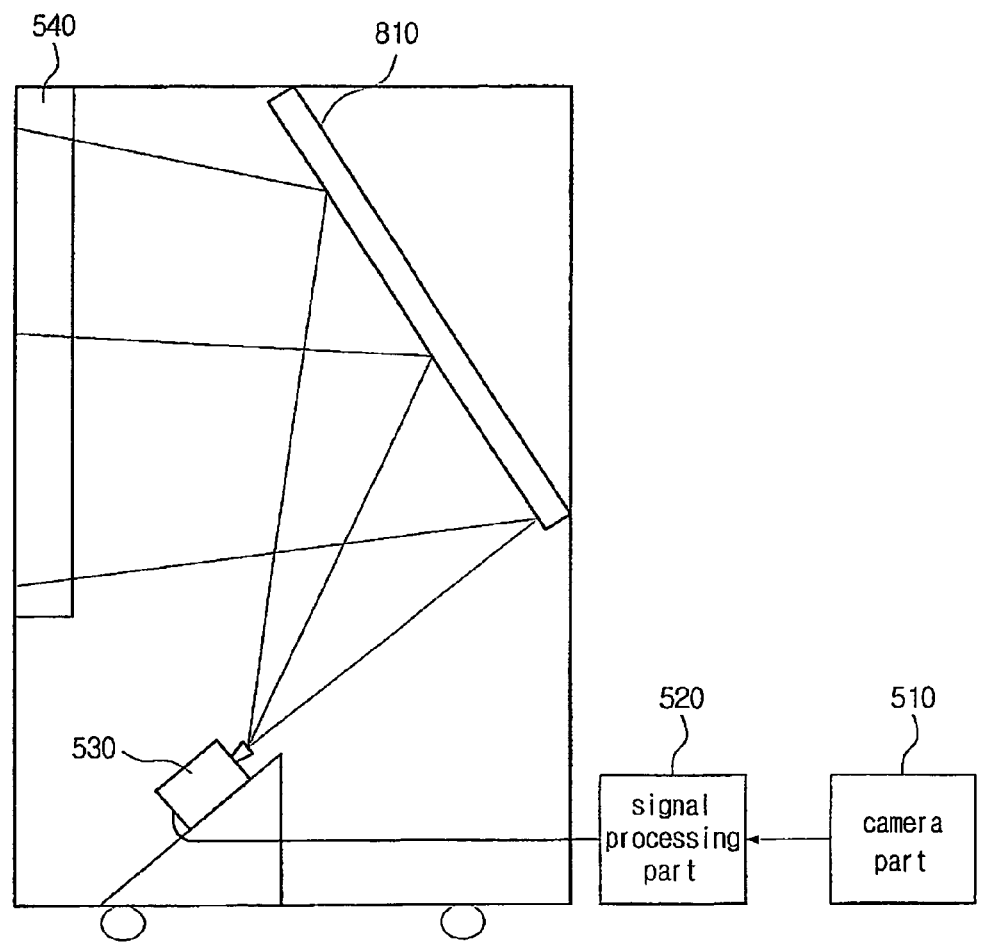
FIG. 14 and FIG. 15 illustrate a stereoscopic display system according to one embodiment of the present invention.
Figure 15:
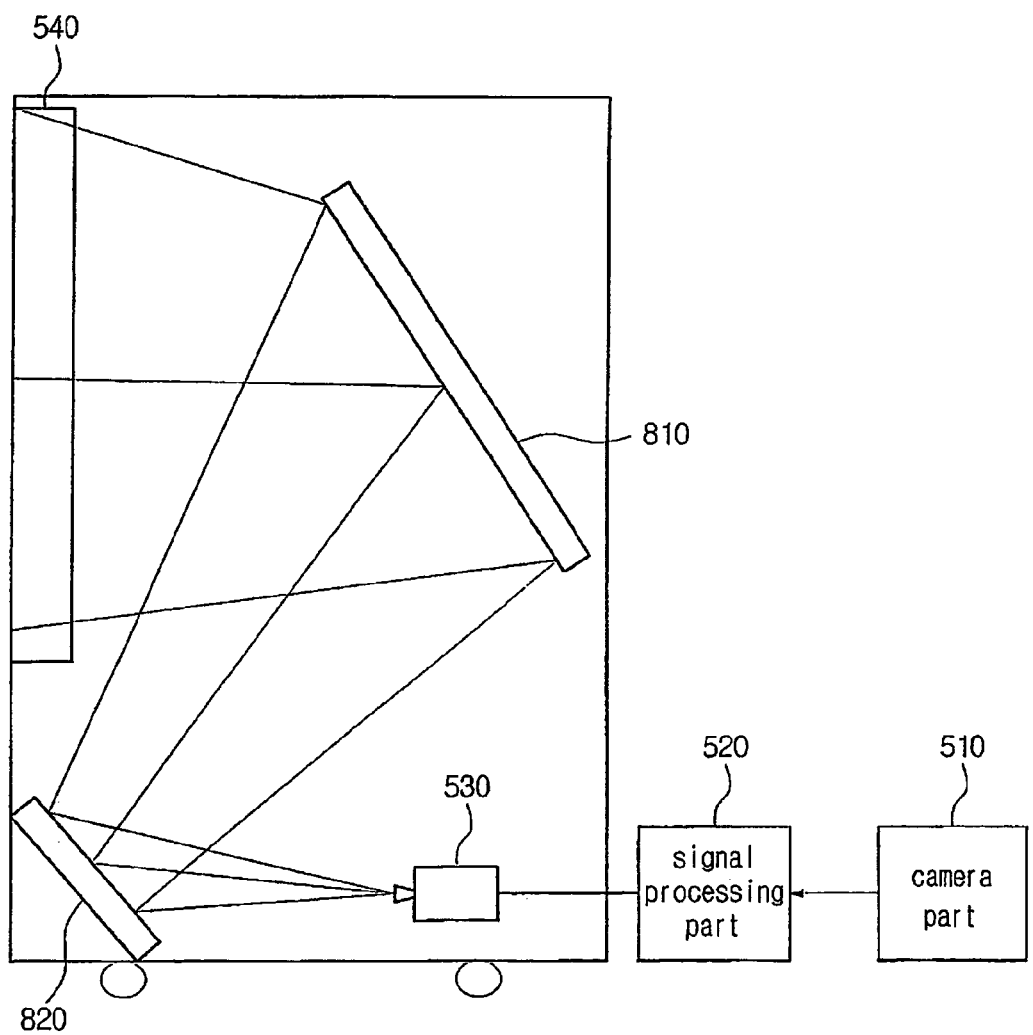

FIG. 14 illustrates a stereoscopic display system according to one embodiment of the present invention and FIG. 15 illustrates a stereoscopic display system according to another embodiment of the present invention.

FIG. 14 and FIG. 15 illustrate a 100" 2D/3D stereoscopic projection display system manufactured actually.

In this system, two IEEE 1394 cameras are employed for the stereo camera system, and the two cameras are controlled to be on the epipolar line geometrically and the distance between the centers of two cameras is kept to be about 65 mm. The camera model used in the experiment is Aplux C102T with a resolution of 640×480 pixels and a frame rate of 15 fps, which is set on RGB24 mode. The right and left images obtained from the right and left cameras are color-signal-processed and projected onto the screen through the right and left projectors. Two NEC MT 1060 projectors are used to project the stereo image pairs to the screen, and the one projector is rotated by 90 degree physically. And the 100" microgem screen is employed, which may provide a wide viewing angle of 160 on both vertical and horizontal directions and uniform stereoscopic image. The viewer may see the stereoscopic image with a 0 and 90 degree linear polarized glasses from the image projected onto the screen. According to the polarized stereoscopic projection display system of high brightness without output light loss, the prototype of 100" 2D/3D stereoscopic projection TV was designed and manufactured actually.

Referring to FIG. 14 and FIG. 15, the projector part (530) may comprise two projectors (531, 532). That is, an image projection system may comprise the projector part (530) which includes the projector rotated by 90 degree and the projector in a normal state and at least one reflecting mirror and the screen (540). Here, the screen may comprise one reflecting mirror (810) as shown in FIG. 14, or a first and a second reflecting mirror (810, 820) as shown in FIG. 15.

According to one embodiment of the present invention, the left projector (532) is in a normal state and the right projector (531) is rotated by 90 degree. Here, because the left image from the left projector (532) in a normal state has a aspect ratio of 4:3 and the right image from the right projector (531) rotated by 90 degree has a aspect ratio of 3:4, so the right image is resized by the aspect ratio of 4:3 with employing the 3D Reform function of the projector and superimposed to the left eye image in the screen part (540). Especially, according to one embodiment of the present invention, 2D/3D stereoscopic projection TV is achieved by adding only one projector to the prior 2D projection TV. So one embodiment of the present invention may output the left eye image and the right eye image which are orthogonal to each other without polarization filter and project them onto the large-sized screen (540). The viewer may see the stereoscopic image with glasses from the image projected onto the screen.

Figure 16:
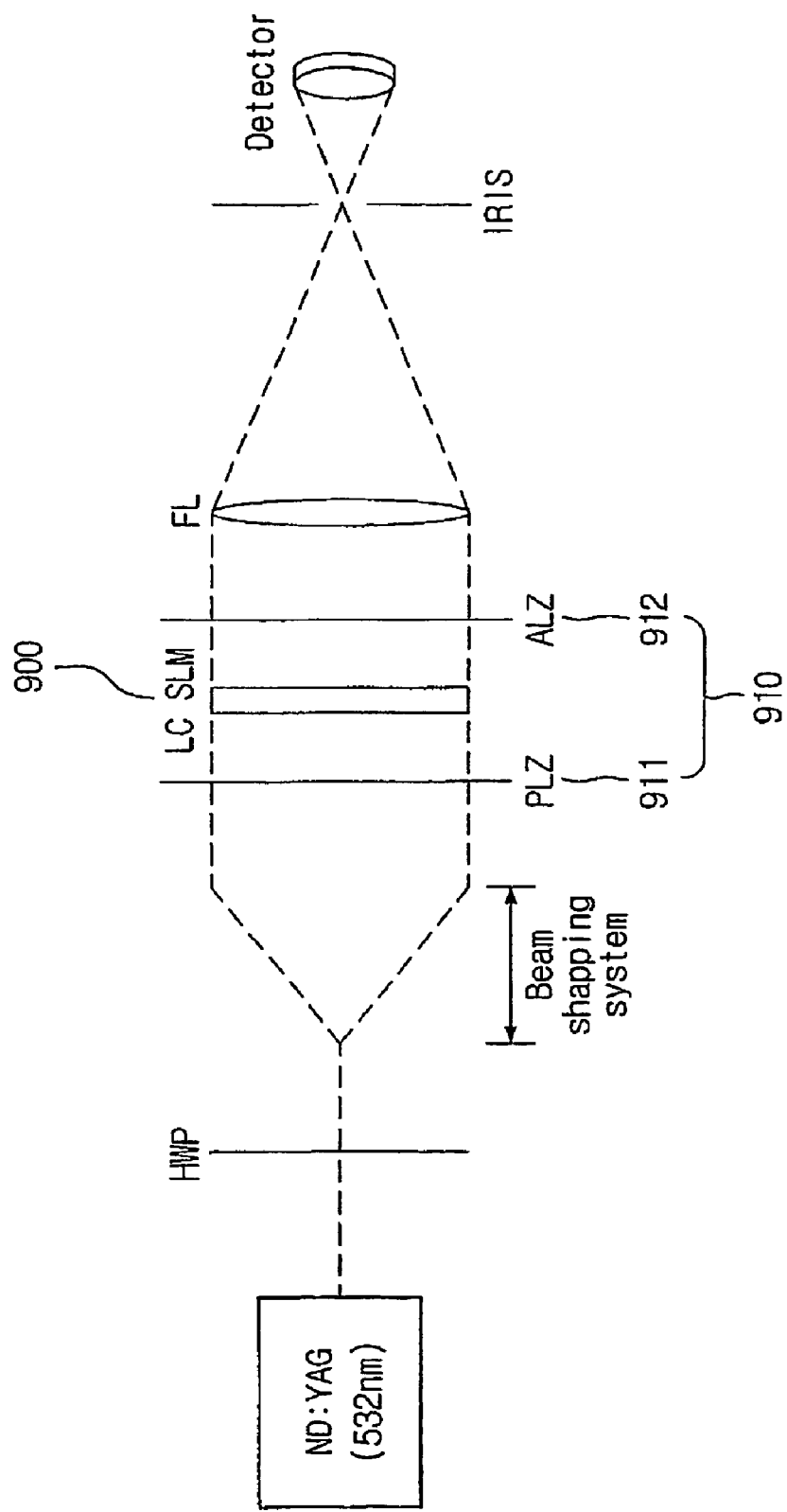
FIG. 16 illustrates a configuration for analyzing properties according to one embodiment of the present invention.
Figure 17:
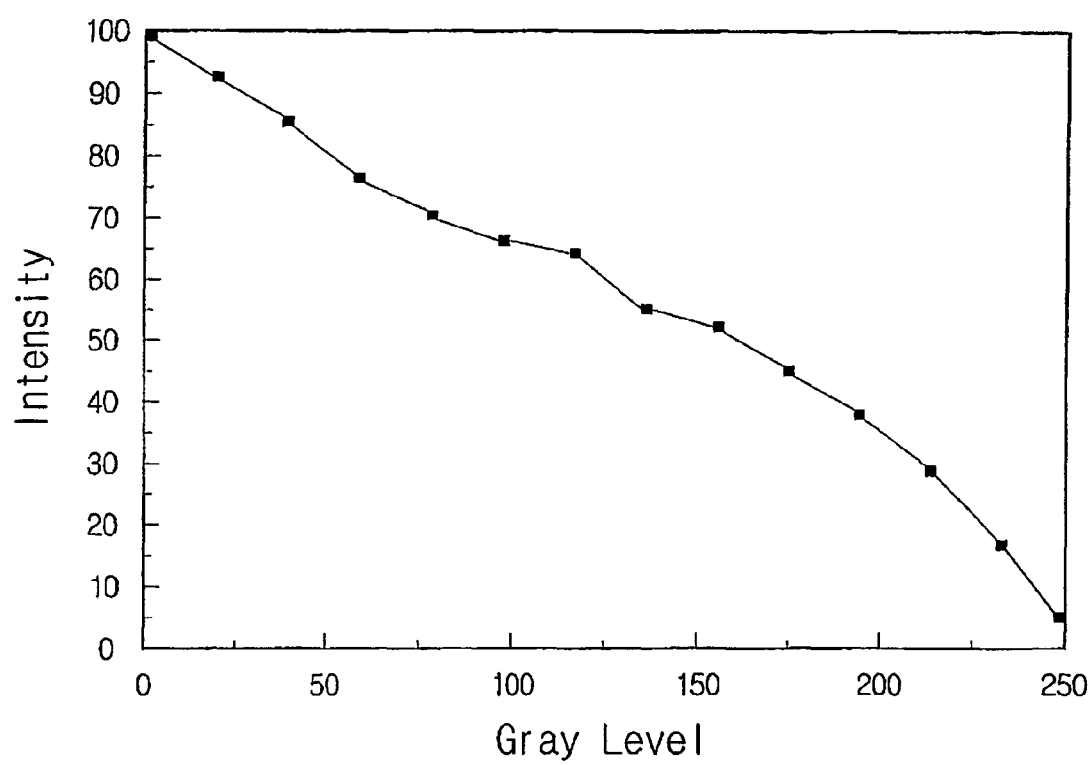
FIG. 17 and FIG. 18 is a graph of illustrating experimental results according to one embodiment of the present invention.
Figure 18:
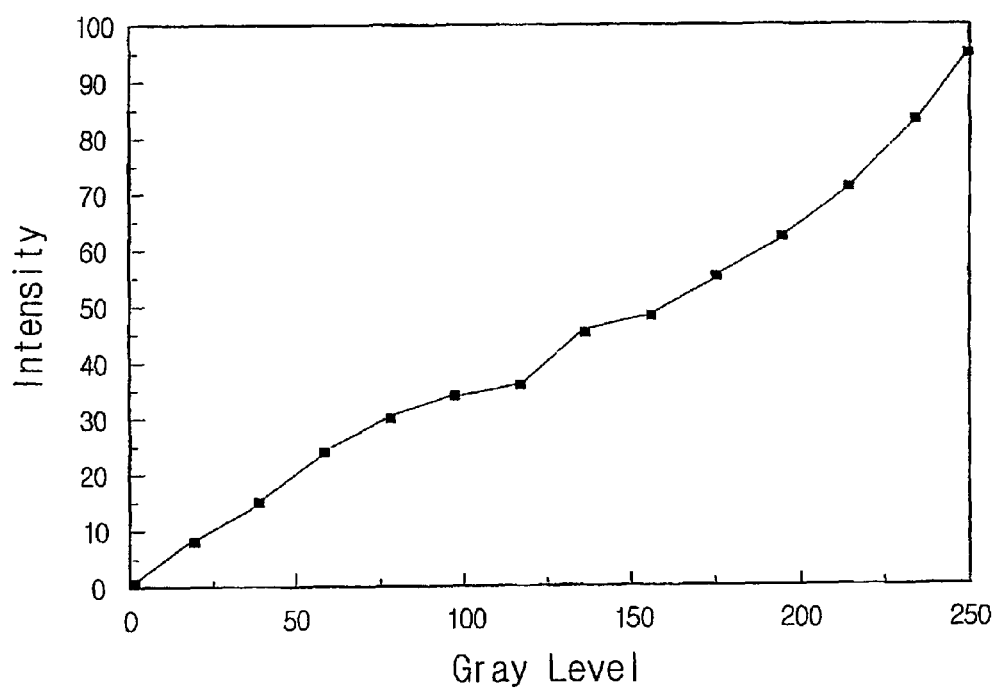
Figure 19:
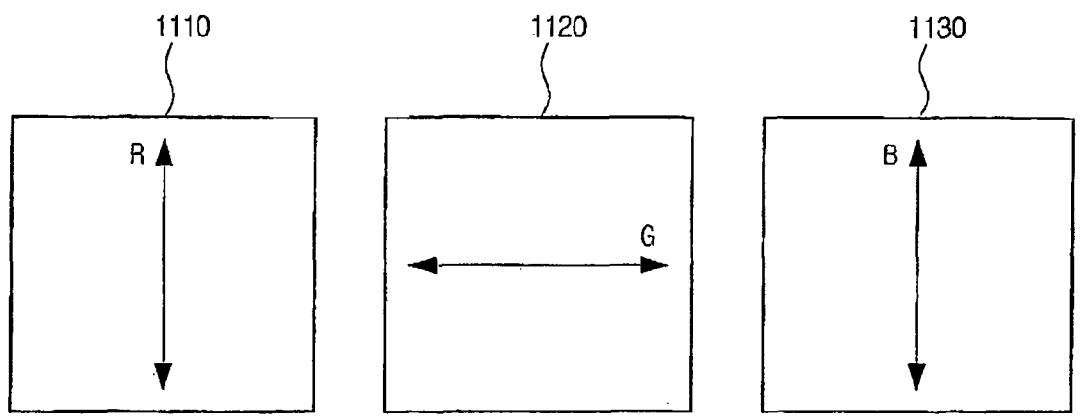
FIG. 19 and FIG. 20 illustrate a direction of polarization filter of inner LCD in a projector according to one embodiment of the present invention.
Figure 20:
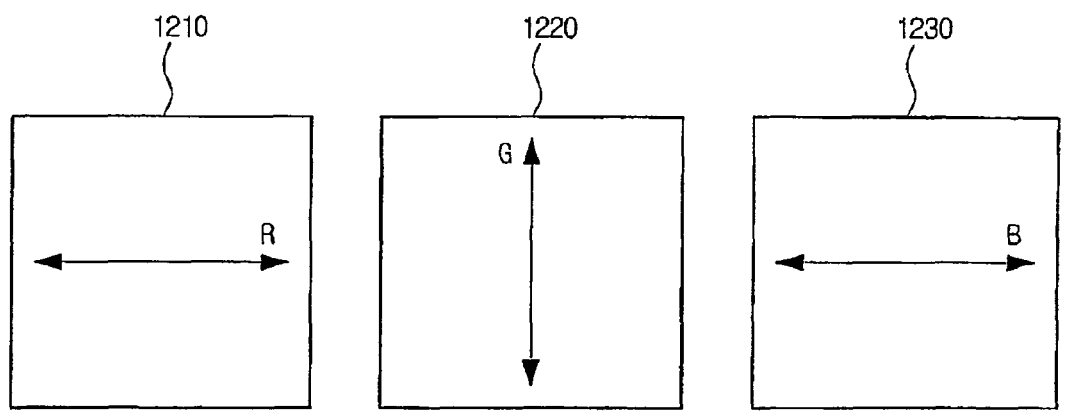

Hereinafter, referring to FIG. 15, the 3D image outputted from the projector part (530) is projected onto a first reflecting panel (820). The light projected onto the first reflecting panel (820) is projected onto a second reflecting panel (810) and projected onto the screen (540) by the second reflecting panel (810). It is obvious that image signal may be controlled by the angle of the at least one reflecting panel and the number or the size of the reflecting panel may be changed corresponding to the changed size of the screen (540). According to the experiment results of one embodiment of the present invention, it is noted that the clear stereoscopic image may be achieved also on the large-sized screen measuring more than 100 inches Other Embodiments Hereinafter, FIG. 16 illustrates a method for producing the right eye image and the left eye image which are orthogonal to each other by the rotation of the polarization part without the rotation of the projector. FIG. 17 and FIG. 18 verify the effect of the other embodiment shown in FIG. 16. And FIG. 19 and FIG. 20 illustrate a direction of polarization filter of the inner LCD in the projector.

FIG. 16 illustrates a configuration of lossless polarized stereoscopic display device according to another embodiment of the present invention.

In the above, the case that one projector in the projector part (540) is installed with a 90 degree rotation is described, but it is obvious that the polarization part (910) included in the projector is rotated by 90 degree without the rotation of the projector. For example, referring the inner configuration of the conventional 3-panel LCD projectors, the LCD panel (900) is included and this LCD panel (900) has its own polarization properties. One embodiment of the present invention may provide a stereoscopic image without using the polarization filter by employing the polarization properties of the LCD panel (900) and the projector is rotated by 90 degree physically to control the direction of the polarization. However, if the polarization part (910) included in the projector is rotated, it is obvious that the stereoscopic projection system is achieved without the physical rotation of the projector. Here, the polarization part (910) may comprise a polarizer (911) and an analyzer (912).

There are the polarizer (911) and the analyzer (912) in both sides of the LCD panel (900), and the light which is not polarized is polarized in predetermined direction through the polarizer (911), and rotated by 90 degree through a liquid crystal. And then the light passes the analyzer (912) disposed in the other side of the LCD panel (900) and the image is achieved. Here, if the direction of the polarizer (911) is orthogonal to that of the analyzer (912) in one projector and the direction of the polarizer (911) is the same to that of the analyzer (912) in the other projector, then the polarization direction of the projector output may be rotated by 90 degree. Here, if a gray level of voltage is controlled according to the direction change of the polarizer (911) and the analyzer (912), then the stereoscopic projection system of high efficiency may be achieved without the rotation of the projector.

Referring to FIG. 16, the configuration for analyzing properties of the LCD panel (900) according to another embodiment of the present invention. In FIG. 16 where the polarizer (911) and the analyzer (912) are disposed in both sides of the LCD panel (900), only the analyzer (912) is changed and the polarizer (911) is not changed for convenience of the experiment.

FIG. 17 shows the case that the direction of the polarizer (911) is orthogonal to that of the analyzer (912), FIG. 18 shows the case that the direction of the polarizer (911) is the same to that of the analyzer (912). Referring to FIG. 17 and FIG. 18, two cases are symmetrical to each other, so if the direction of the analyzer (912) disposed in the LCD panel (900) included in the projector is changed, then the stereoscopic projection system of high efficiency may be achieved without the rotation of the projector.

Referring to FIG. 19 and FIG. 20, the direction of the polarization filter in LCD included in the projector is shown. The polarization filter (1110) of the red output beam corresponding to the left eye image is orthogonal to the polarization filter (1210) of the red output beam corresponding to the right eye image. Likewise, the polarization filter (1120) of the green output beam corresponding to the left eye image is orthogonal to the polarization filter (1220) of the green output beam corresponding to the right eye image, and the polarization filter (1130) of the blue output beam corresponding to the left eye image is orthogonal to the polarization filter (1230) of the blue output beam corresponding to the right eye image. That is, because the polarization filter of the LCD corresponding to the left eye image and the polarization filter of the LCD corresponding to the right eye image are symmetrical to each other, if the direction of the analyzer disposed in the LCD panel included in the projector is changed, then the stereoscopic projection system of high efficiency may be realized without the physical rotation of the projector.

According to the lossless polarized stereoscopic display device of one embodiment of the present invention, a polarized stereoscopic display method and a device thereof having a high brightness with no output light loss may be provided by eliminating effectively a polarization filter with employing the polarization properties of a LCD projector and a color signal process method. That is, at least one embodiment of the present invention may provide a stereoscopic image without a polarization filter with employing the characteristic output beam properties of the LCD display device.

Also, according to the lossless polarized stereoscopic display device according to one embodiment of the present invention, a access method for solving the problem of light loss with employing the polarized stereoscopic projection display system with no output light loss may be provided by eliminating the polarization filter which is the cause of the light loss from the prior projection display system by effective process of the characteristic polarization properties of the LCD projector and the color video signal.

Also, according to the lossless polarized stereoscopic display device according to one embodiment of the present invention, a substantial possibility of commercialization may be provided by designing a prototype of 100" 2D/3D projection TV and verifying the performance and the effect through an optical experiment. While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A polarized stereoscopic display device for displaying stereoscopically a first image and a second image of an object photographed at different angles, the device comprising:
   a first signal processor configured to signal process the first image and produce a first processed image;
   a second signal processor configured to signal process the second image and produce a second processed image;
   a first projector configured to receive and project the first processed image on a screen; and
   a second projector configured to receive and project the second processed image on the screen, wherein the output images of the first and second projectors have a 90 degree phase difference from each other,
   wherein one of the first signal processor and the first projector comprises:
   an image rotating portion configured to rotate the first image by 90 degrees; and
   an adjusting portion configured to adjust at least one of the horizontal and vertical distances of the rotated image to fit in the size of the screen and output it to the first projector,
   wherein the first projector is rotated 90 degrees about a projection axis thereof with respect to the second projector so that the output images of the first and second projectors have a 90 degree phase difference from each other, wherein the first and second projectors do not require a polarization element, and wherein the first and second projectors are substantially parallel with respect to the projection axis.

2. The polarized stereoscopic display device according to claim 1, wherein the first signal processor comprises a first signal synthesizing portion configured to synthesize an R (RED) signal component and a B (blue) signal component of the first image and a G (Green) signal component of the second image and provide it the image rotating portion.

3. The polarized stereoscopic display device according to claim 1, wherein the first signal processor comprises the image rotating portion and the adjusting portion.

4. The polarized stereoscopic display device according to claim 1, wherein the second signal processor comprises a second signal synthesizing portion configured to synthesize an R (RED) signal component and a B (blue) signal component of the second image and a G (Green) signal component of the first image.

5. The polarized stereoscopic display device according to claim 1, further comprising at least one reflecting mirror configured to reflect the outputs of the first and second projectors to the screen.

6. A polarized stereoscopic display method of displaying stereoscopically a first image and a second image of an object photographed at different angles, the method comprising:
   first signal processing the first image so as to produce a first processed image;
   second signal processing the second image so as to produce a second processed image;
   projecting, at a first projector, the first processed image on a screen; and
   projecting, at a second projector, the second processed image on the screen,
   wherein the first and second projected images have a 90 degree phase difference from each other, and wherein the first and second projectors do not require a polarization element,
   wherein the first signal processing comprises rotating the first image by 90 degrees, wherein the first projector is rotated 90 degrees about a projection axis thereof with respect to the second projector so that the output images of the first and second projectors have a 90 degree phase difference from each other, and wherein the first and second projectors are substantially parallel with respect to the projection axis.

7. The polarized stereoscopic display method according to claim 6, wherein the second signal processing comprises synthesizing an R (RED) signal component and a B (blue) signal component of the second image and a G (Green) signal component of the first image.

8. The polarized stereoscopic display method according to claim 6, wherein the first signal processing comprises synthesizing an R (RED) signal component and a B (blue) signal component of the first image and a G (Green) signal component of the second image.

9. The polarized stereoscopic display method according to claim 6, further comprising adjusting at least one of the horizontal and vertical distances of the rotated first image to fit in the size of the screen.

10. The polarized stereoscopic display method according to claim 6, further comprising reflecting the first and second projected images to the screen.

11. A polarized stereoscopic display device for displaying stereoscopically a first image and a second image of an object photographed at different angles, the device comprising:
   a first signal processing unit configured to process the first image, wherein the first signal processing unit includes a first projector configured to receive and project the first processed image on a screen; and
   a second signal processing unit configured to process the second image, wherein the first and second processed images have a 90 degree phase difference from each other, wherein at least one of the first signal processing unit and the second signal processing unit is configured to rotate the respective image, wherein the second signal processing unit includes a second projector configured to receive and project the second processed image on the screen, and wherein the output images of the first and second projectors have a 90 degree phase difference from each other,
   wherein the first projector is rotated 90 degrees about a projection axis thereof with respect to the second projector so that the output images of the first and second projectors have a 90 degree phase difference from each other, wherein the first and second projectors do not require a polarization element, and wherein the first and second projectors are substantially parallel with respect to the projection axis.

12. The polarized stereoscopic display device according to claim 11, wherein the first processor comprises an adjusting portion configured to adjust at least one of the horizontal and vertical distances of the rotated image to fit in the size of the screen and output it to the first projector.

13. The polarized stereoscopic display device according to claim 1, wherein only one of the first and second projectors outputs a 90 degree rotated image.

14. The polarized stereoscopic display method according to claim 6, wherein only one of the first and second projectors outputs a 90 degree rotated image.

15. The polarized stereoscopic display device according to claim 11, wherein only one of the first and second projectors outputs a 90 degree rotated image.

* * * * *